(12) United States Patent
Nakamura

(10) Patent No.: US 8,456,357 B2
(45) Date of Patent: Jun. 4, 2013

(54) COMMUNICATION DEVICE, COMMUNICATION METHOD, PROGRAM AND COMMUNICATION SYSTEM

(75) Inventor: Katsuyuki Nakamura, Kanagawa (JP)

(73) Assignee: Sony Corporation, Tokyo (JP)

(*) Notice: Subject to any disclaimer, the term of this patent is extended or adjusted under 35 U.S.C. 154(b) by 85 days.

(21) Appl. No.: 12/817,368

(22) Filed: Jun. 17, 2010

(65) Prior Publication Data

US 2011/0006945 A1     Jan. 13, 2011

(30) Foreign Application Priority Data

Jul. 7, 2009   (JP) .............................. P2009-160800

(51) Int. Cl.
*G01S 19/03* (2010.01)
*G01S 19/05* (2010.01)

(52) U.S. Cl.
USPC .................................. 342/357.42; 342/357.4

(58) Field of Classification Search
USPC ............... 342/357.4, 357.42, 357.46, 357.63, 342/357.67; 701/468, 470
See application file for complete search history.

(56) References Cited

U.S. PATENT DOCUMENTS

| 6,570,528 B1* | 5/2003 | Rao et al. ...................... 342/354 |
| 6,633,745 B1* | 10/2003 | Bethscheider ............... 455/12.1 |
| 2006/0187116 A1* | 8/2006 | Uozumi .................... 342/357.06 |

FOREIGN PATENT DOCUMENTS

JP          2001-74826       3/2001

* cited by examiner

*Primary Examiner* — Dao Phan
(74) *Attorney, Agent, or Firm* — Sherr & Jiang, PLLC

(57) ABSTRACT

A communication device is provided which includes a positioning information receiving portion that receives positioning information, by wireless signal, from another communication device, the positioning information including first satellite orbit information that indicates respective orbits of a specific number of satellites and position information that indicates a position of the other communication device, an initialization processing portion that performs initialization processing that specifies, based on the positioning information received by the positioning information receiving portion, from among the specific number of satellites, a plurality of satellites transmitting satellite signals that can be received by the communication device.

14 Claims, 11 Drawing Sheets

COMMUNICATION DEVICE, COMMUNICATION METHOD, PROGRAM AND COMMUNICATION SYSTEM

BACKGROUND OF THE INVENTION

1. Field of the Invention

The present invention relates to a communication device, a communication method, a program and a communication system.

2. Description of the Related Art

In recent years, a global positioning system (GPS) is known as positioning technology that uses satellite signals transmitted from satellites. With positioning technology using GPS, it is possible for a terminal that receives satellite signals from satellites to perform positioning to determine its own position.

Here, for example, even when the number of satellites is approximately thirty in total, when the terminal performs positioning using the satellite signals, it generally receives signals from three or four of the approximately thirty satellites. For that reason, the terminal requires time to identify from which satellites to receive the satellite signals with which to perform positioning. As a result, when the terminal performs positioning, if the terminal ascertains in advance orbit information (almanac data, for example) that indicates an orbit of a satellite and position information that indicates a general position of the terminal itself and so on, it is possible to reduce the amount of time required to identify which satellite to receive satellite signals from for use in performing positioning.

Furthermore, when the terminal performs positioning, if the terminal ascertains in advance accurate satellite orbit information (ephemeris data, for example), it is not necessary to download accurate satellite orbit information from the satellite for use in performing positioning. Therefore, if the terminal ascertains in advance accurate satellite orbit information, it is possible to reduce the time required to perform positioning. For example, Japanese Patent Application Publication No. JP-A-2001-74826 discloses technology in which a device that is capable of determining its own position by receiving satellite signals is placed at a base station, and accurate satellite orbit information that is included in satellite signals received by the base station is acquired by the terminal and used to perform positioning of the terminal.

SUMMARY OF THE INVENTION

However, with the type of technology described above, effort is required and costs are incurred in order to place equipment at the base station to perform positioning. Furthermore, in a situation in which the terminal is unable to perform communication with the base station, it is not possible to reduce the time required for the terminal to perform positioning.

In light of the foregoing, it is desirable to provide a novel and improved technology that makes it possible to reduce effort and costs required to install equipment at a base station to perform positioning and also, in a situation in which communication cannot be performed with the base station, makes it possible to shorten time required for a terminal to perform positioning.

According to an embodiment of the present invention, there is provided a communication device including a positioning information receiving portion that receives positioning information, by wireless signal, from another communication device, the positioning information including first satellite orbit information that indicates respective orbits of a specific number of satellites and position information that indicates a position of the other communication device, an initialization processing portion that performs initialization processing that specifies, based on the positioning information received by the positioning information receiving portion, from among the specific number of satellites, a plurality of satellites transmitting satellite signals that can be received by the communication device, a satellite signal receiving portion that receives satellite signals from each of the specific number of satellites, and a positioning processing portion that, from among the satellite signals received by the satellite signal receiving portion, synchronizes with the satellite signals transmitted from each of the plurality of satellites specified by the initialization processing portion, acquires, from the synchronized satellite signal, satellite time information indicating a transmission time of the satellite signal and acquires, from an internal clock installed inside the communication device, current time information indicating a current time, calculates, based on the satellite time information and the current time information, a distance between the communication device and each of the plurality of satellites, and performs positioning of the communication device, based on the calculated distances and on a plurality of second satellite orbit information, the plurality of second satellite orbit information indicating the respective orbits of the plurality of satellites to a higher degree of accuracy than the first satellite orbit information.

The positioning processing portion additionally may acquire the plurality of second satellite orbit information from each of the synchronized satellite signals, and perform the positioning based on the acquired plurality of second satellite orbit information and the distances.

The communication device may further include a storage portion that stores a threshold value, and a positioning information registering portion that acquires, from the internal clock, acquisition time information indicating a time at which the plurality of second satellite orbit information is acquired by the positioning processing portion, and registers the acquired acquisition time information in the storage portion in association with the plurality of second satellite orbit information.

The positioning processing portion may acquire, from the internal clock, current time information indicating a current time, determines whether a difference value between the acquisition time information registered in the storage portion and the current time information exceeds the threshold value stored by the storage portion, and, when the difference value does not exceed the threshold value, omits processing to acquire the plurality of second satellite orbit information from each of the synchronized satellite signals and performs the positioning based on the plurality of second satellite orbit information registered in the storage portion in association with the acquisition time information and on the distances.

The positioning information receiving portion additionally may receive the plurality of second satellite orbit information by the wireless signal from the other communication device.

The positioning processing portion may perform the positioning based on the plurality of second satellite orbit information received by the positioning information receiving portion and on the distances.

The communication device may further include a storage portion that stores a threshold value, and a positioning information registering portion that acquires, from the internal clock, acquisition time information indicating a time at which the plurality of second satellite orbit information is received by the positioning information receiving portion, and registers the acquired acquisition time information in the storage portion in association with the plurality of second satellite orbit information.

The positioning processing portion may acquire, from the internal clock, current time information indicating a current time, determine whether a difference value between the acquisition time information registered in the storage portion and the current time information exceeds the threshold value stored by the storage portion, and, when the difference value does not exceed the threshold value, omit processing to perform the positioning based on the plurality of second satellite orbit information received by the positioning information receiving portion and on the distances, further acquire the plurality of second satellite orbit information from each of the synchronized satellite signals, and perform the positioning based on the acquired plurality of second satellite orbit information and the distances.

When the positioning information receiving portion receives the plurality of second satellite orbit information by the wireless signal from each of a plurality of the other devices, the positioning processing portion may perform the positioning based on the plurality of second satellite orbit information to which acquisition time information indicating a new acquisition time of the plurality of second satellite orbit information is attached, from among the plurality of second satellite orbit information received from each of the plurality of other devices, and on the distances.

When the positioning information receiving portion receives the plurality of second satellite orbit information by the wireless signal from each of the plurality of other communication devices, the positioning processing portion may perform the positioning based the distances and on the plurality of second satellite orbit information that is received by the wireless signal with large radio wave strength, from among the plurality of second satellite orbit information received from each of the plurality of other communication devices by the positioning information receiving portion.

According to another embodiment of the present invention, there is provided a communication device include, a device identification information receiving portion that receives, by wireless signal, from another communication device, device identification information to identify the other communication device, a positioning information transmission request transmitting portion that transmits, to a management device via a network, a positioning information transmission request that includes the device identification information received by the device identification information receiving portion, a positioning information receiving portion that receives, from the management device via the network, as a response to the positioning information transmission request, positioning information that is associated with the device identification information and is managed by the management device, the positioning information including first satellite orbit information and position information, the first satellite orbit information indicating respective orbits of a specific number of satellites and the position information indicating a position of the other communication device, an initialization processing portion that performs initialization processing that specifies, based on the positioning information received by the positioning information receiving portion, from among the specific number of satellites, a plurality of satellites transmitting satellite signals that can be received by the communication device a satellite signal receiving portion that receives satellite signals from each of the specific number of satellites, and a positioning processing portion that, from among the satellite signals received by the satellite signal receiving portion, synchronizes with the satellite signals transmitted from each of the plurality of satellites specified by the initialization processing portion, acquires, from the synchronized satellite signal, satellite time information indicating a transmission time of the satellite signal and acquires, from an internal clock installed inside the communication device, current time information indicating a current time, calculates, based on the satellite time information and the current time information, a distance between the communication device and each of the plurality of satellites, and performs positioning of the communication device, based on the calculated distances and on a plurality of second satellite orbit information, the plurality of second satellite orbit information indicating the respective orbits of the plurality of satellites to a higher degree of accuracy than the first satellite orbit information.

According to the embodiments of the present invention described above, effort and costs required to install equipment at a base station to perform positioning can be reduced, and at the same time, in a situation in which communication cannot be performed with the base station, time required to perform positioning by a terminal can be shortened.

DETAILED DESCRIPTION OF THE EMBODIMENT(S)

Figure 1:
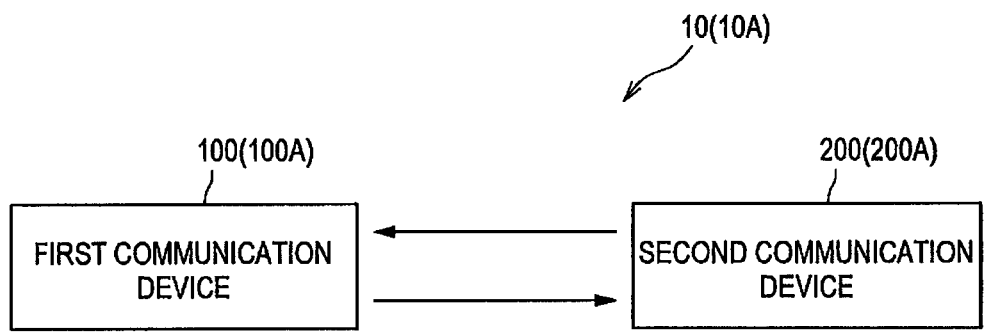
FIG. 1 is a diagram showing a structure of a communication system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The explanation will be made in the following order.

1. First embodiment
 1-1. Structure of communication system
 1-2. Structure of first communication device
 1-3. Structure of second communication device
 1-4. Processing performed by communication system 1-5. Processing performed by second communication device
2. Second embodiment
2-1. Structure of communication system
2-2. Structure of first communication device
2-3. Structure of second communication device
2-4. Structure of management device
2-5. Processing performed by communication system
2-6. Processing performed by second communication device
3. Modified example
4. Conclusion

1. FIRST EMBODIMENT

A first embodiment of the present invention will be explained. When numerals enclosed in parentheses and numerals not enclosed in parentheses are noted alongside each other, the numerals not enclosed in the parentheses are attached to members that are not distinguished by the present embodiment, and the numerals that are enclosed by the parentheses are attached to members that are distinguished by the present embodiment. This also applies to other embodiments of the present invention.

1-1. Structure of Communication System

FIG. 1 is a diagram showing a structure of a communication system according to the first embodiment. As shown in FIG. 1, a communication system 10A according to the first embodiment includes a first communication device 100A and a second communication device 200A. Ad hoc communication can be performed between the first communication device 100A and the second communication device 200A via a wireless local area network (LAN) or the like. The ad hoc communication is made possible by radio waves transmitted from one of the communication devices reaching the other communication device when the first communication device 100A and the second communication device 200A come within a specified distance of each other. It is assumed that the specified distance fluctuates depending on the influence of weather conditions etc., but the specified distance is assumed to be approximately 100 m, for example. The first communication device 100A and the second communication device 200A may be a terminal etc. that can be carried by a user, or may be a desk-top computer or the like.

1-2. Structure of First Communication Device

Figure 2:
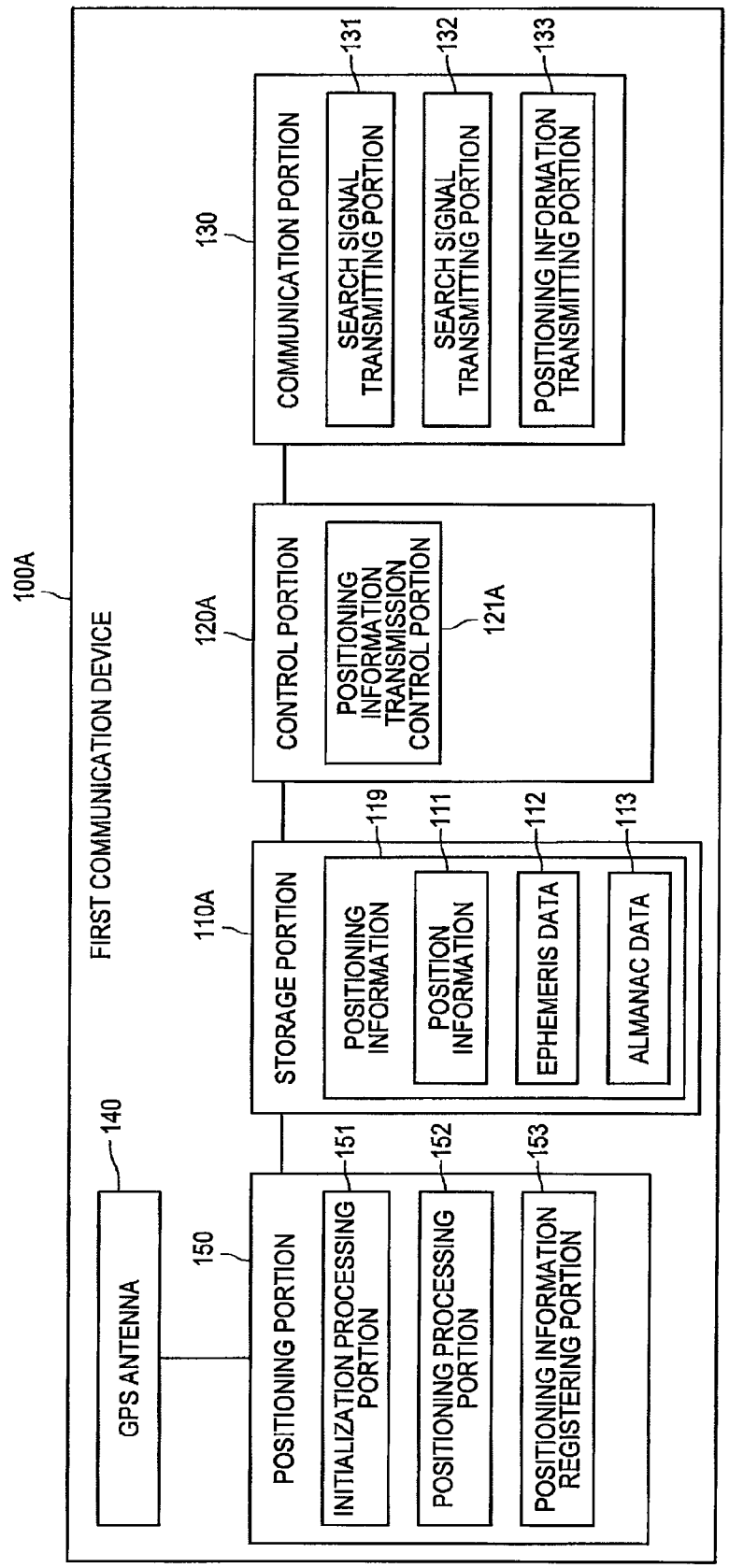
FIG. 2 is a diagram showing a structure of a first communication device according to the first embodiment.

FIG. 2 is a diagram showing a structure of the first communication device according to the first embodiment. As shown in FIG. 2, the first communication device 100A includes a storage portion 110A, a control portion 120A, a communication portion 130, a GPS antenna 140 and a positioning portion 150.

The storage portion 110A stores positioning information 119. The storage portion 110A is a storage device, such as a hard disk drive (HDD) for example. The positioning information 119 is information that is stored in the storage portion 110A by a positioning information registering portion 153, which will be explained later. For example, position information 111 that indicates a position of the first communication device 100A, ephemeris data 112 or almanac data 113 etc. can be used as the positioning information 119. Additionally, the storage portion 110A can store a program and data etc. that is used when the program is executed.

The almanac data 113 is an example of first satellite orbit information that indicates respective orbits of a specific number of satellites. Here, the specific number of satellites is not particularly limited, and is assumed to be, for example, approximately thirty. The ephemeris data 112 are used as an example of second satellite orbit information, which is more accurate than the almanac data 113 that is the example of the first satellite orbit information. The almanac data 113 are information that indicates the orbits of all the satellites, but the ephemeris data 112 are information that indicates the orbit of each of the satellites.

The control portion 120A has a positioning information transmission control portion 121A. The control portion 120A is, for example, a central processing unit (CPU), a random access memory (RAM) or the like. Functions of the control portion 120A are realized, for example, by the program stored in the storage portion 110A being loaded into the RAM by the CPU, and the program loaded into the RAM then being executed by the CPU.

The positioning information transmission control portion 121A controls processing to transmit the positioning information. First, the positioning information transmission control portion 121A controls processing such that a search signal transmitting portion 131 transmits a search signal by wireless signal using ad hoc communication. Next, the positioning information transmission control portion 121A controls processing such that a positioning information transmission request receiving portion 132 receives a positioning information transmission request from the second communication device 200A, which has received the search signal. After that, the positioning information transmission control portion 121A acquires the positioning information 119 from the storage portion 110A and controls processing such that a positioning information transmitting portion 133 transmits the acquired positioning information 119 to the second communication device 200A.

The communication portion 130 includes the search signal transmitting portion 131, the positioning information transmission request receiving portion 132 and the positioning information transmitting portion 133. The communication portion 130 is a communication interface or the like, and can perform ad hoc communication with the second communication device 200A using wireless signals.

The search signal transmitting portion 131 transmits, to the second communication device 200A, a search signal using a wireless signal. Information included in the search signal is not particularly limited, and can include, for example, device identification information that identifies the first communication device 100A. For example, a media access control (MAC) address that identifies the first communication device 100A can be used as the device identification information.

The positioning information transmission request receiving portion 132 receives the positioning information transmission request, which is transmitted, using a wireless signal, from the second communication device 200A that has received the search signal. The positioning information transmission request receiving portion 132 outputs the received positioning information transmission request to the positioning information transmission control portion 121A.

The positioning information transmitting portion 133 transmits the positioning information 119 acquired from the storage portion 110A by the positioning information transmission control portion 121A to the second communication device 200A, using a wireless signal. Here, the positioning information 119 transmitted by the positioning information transmitting portion 133 includes at least the position information 111 and the almanac data 113, and may additionally include the ephemeris data 112.

The GPS antenna 140 receives a satellite signal from a satellite. The GPS antenna 140 outputs the satellite signal received from the satellite to the positioning portion 150.

The positioning portion 150 includes an initialization processing portion 151, a positioning processing portion 152, and the positioning information registering portion 153. Functions of the positioning portion 150 are realized, for example, by the program stored in the storage portion 110A being loaded into the RAM by the CPU, and the program loaded into the RAM then being executed by the CPU.

The initialization processing portion 151 performs initialization processing that specifies, from among the specific number of satellites, a plurality of satellites that transmit satellite signals which can be received by the device itself. In this case, the number of satellites that are specified is not particularly limited, as long as it is a plurality of satellites, and it is assumed that, in actuality, three or four satellites are specified. When the position information 111 and the almanac data 113 are stored in the storage portion 110A as the positioning information 119, the initialization processing portion 151 performs initialization processing based on the position information 111 and the almanac data 113 stored in the storage portion 110A. When the positioning information 119 is not stored in the storage portion 110A, the initialization processing portion 151 synchronizes with the satellite signals transmitted respectively from the plurality of satellites specified by the initialization processing portion 151, and performs initialization processing based on the almanac data 113 acquired from the synchronized satellite signals.

The positioning processing portion 152 synchronizes with the satellite signals transmitted respectively from the plurality of satellites specified by the initialization processing portion 151. Following that, the positioning processing portion 152 acquires, from the synchronized satellite signal, satellite time information that indicates a transmission time of the satellite signal. At the same time, the positioning processing portion 152 also acquires, from an internal clock installed inside the device itself, current time information that indicates a current time. Next, based on the satellite time information and the current time information, the positioning processing portion 152 calculates a distance between the device itself and each of the plurality of satellites, respectively. Following that, the positioning processing portion 152 performs positioning of the device itself, based on the calculated distances and a plurality of the ephemeris data 112.

Here, when the ephemeris data 112 are stored by the storage portion 110A, the positioning processing portion 152 can use the ephemeris data 112 that are stored by the storage portion 110A. Further, when the ephemeris data 112 are not stored by the storage portion 110A, the positioning processing portion 152 can further acquire a plurality of the ephemeris data 112 from each of the synchronized satellite signals, respectively, and can use the acquired plurality of ephemeris data 112. When the positioning processing portion 152 calculates the respective distances between the device itself and the plurality of satellites based on the satellite time information and the current time information, the distance can be calculated, for example, by multiplying a difference value between the satellite time information and the current time information by the speed of light.

When performing positioning of the device itself, the positioning processing portion 152 can, for example, take as a point of reference the position of the satellite indicated by the ephemeris data 112, and obtain, for the plurality of satellites, a set of positions separated by the calculated distance, then determine, as the position of the device itself, a common point of the obtained respective sets.

The positioning information registering portion 153 registers, in the storage portion 110A, the position information 111, which indicates the position of the device itself for which positioning has been performed by the positioning processing portion 152. Additionally, the positioning information registering portion 153 can register, in the storage portion 110A, the almanac data 113 that are acquired by the initialization processing portion 151 and the ephemeris data 112 that are acquired by the positioning processing portion 152. When registering the position information 111, the ephemeris data 112 and the almanac data 113 in the storage portion 110A, the positioning information registering portion 153 can store each of the pieces of information in association with time information that indicates a time at which each of the pieces of information are acquired. Then, the positioning information registering portion 153 may delete, as invalid information, each of the pieces of information stored by the storage portion 110A that are associated with the time information for which a predetermined period of time has elapsed.

1-3. Structure of Second Communication Device

Figure 3:
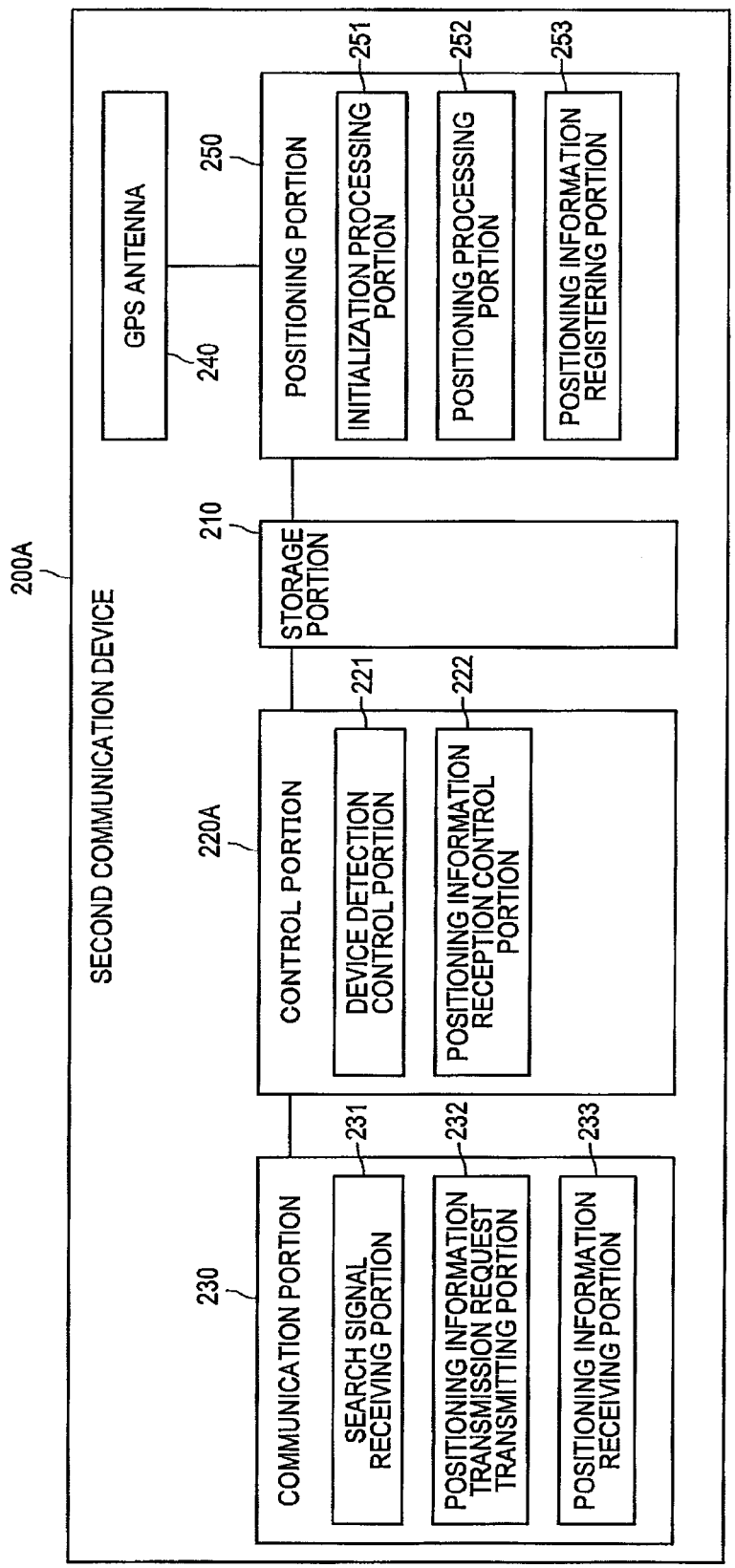
FIG. 3 is a diagram showing a structure of a second communication device according to the first embodiment.

FIG. 3 is a diagram that shows a structure of the second communication device 200A according to the first embodiment. As shown in FIG. 3, the second communication device 200A includes a storage portion 210, a control portion 220A, a communication portion 230, a GPS antenna 240 and a positioning portion 250.

The storage portion 210 is a storage device, such as an HDD, for example. The storage portion 210 can store a program and data etc. that is used when the program is executed.

The control portion 220A has a device detection control portion 221 and a positioning information reception control portion 222. The control portion 220A is, for example, a CPU, a RAM or the like. Functions of the control portion 220A are realized, for example, by the program stored in the storage portion 210 being loaded into the RAM by the CPU, and the program loaded into the RAM then being executed by the CPU.

The device detection control portion 221 controls processing such that a search signal receiving portion 231 receives a search signal from the first communication device 100A by wireless signal using ad hoc communication. When the search signal is received from the first communication device 100A, the device detection control portion 221 outputs the received search signal to the positioning information reception control portion 222.

The positioning information reception control portion 222 controls processing to receive positioning information. First, the positioning information reception control portion 222 receives input of the search signal from the device detection control portion 221. When the positioning information reception control portion 222 receives input of the search signal from the device detection control portion 221, it controls processing such that a positioning information transmission request transmitting portion 232 transmits the positioning information transmission request by wireless signal using ad hoc communication. Next, the positioning information reception control portion 222 controls processing such that a positioning information receiving portion 233 receives the positioning information, by wireless signal using ad hoc communication, from the first communication device 100A.

The communication portion 230 includes the search signal receiving portion 231, the positioning information transmission request transmitting portion 232 and the positioning information receiving portion 233. The communication portion 230 is a communication interface or the like, and can perform ad hoc communication with the first communication device 100A using wireless signals.

The search signal receiving portion 231 receives the search signal by wireless signal from the first communication device 100A. Information included in the search signal is not particularly limited, and can include, for example, device identification information that identifies the first communication device 100A. For example, a media access control (MAC) address that identifies the first communication device 100A can be used as the device identification information.

The positioning information transmission request transmitting portion 232 transmits a positioning information transmission request by wireless signal to the first communication device 100A that is the transmission source of the search signal.

The positioning information receiving portion 233 receives positioning information by wireless signal from the first communication device 100A. Here, the positioning information received by the positioning information receiving portion 233 includes at least the position information and the almanac data, and may additionally include the ephemeris data.

The GPS antenna 240 receives a satellite signal from a satellite. The GPS antenna 240 outputs the satellite signal received from the satellite to the positioning portion 250.

The positioning portion 250 includes an initialization processing portion 251, a positioning processing portion 252 and a positioning information registering portion 253. Functions of the positioning portion 250 are realized, for example, by the program stored in the storage portion 210 being loaded into the RAM by the CPU, and the program loaded into the RAM then being executed by the CPU.

The initialization processing portion 251 performs initialization processing that, based on the positioning information received by the positioning information receiving portion 233, specifies, from among a specific number of satellites, a plurality of satellites transmitting satellite signals that can be received by the device itself. In this case, the number of satellites that are specified is not particularly limited, as long as it is a plurality of satellites, and it is assumed that, in actuality, three or four satellites are specified. When the storage portion 210 stores, as positioning information, the position information of the device itself and the almanac data, the initialization processing portion 251 may perform initialization processing based on the position information and the almanac data stored by the storage portion 210.

By specifying the plurality of satellites transmitting satellite signals that can be received by the device itself from among the specific number of satellites, based on the positioning information received by the positioning information receiving portion 233 in this way, the time required to perform initialization processing can be shortened. In general, satellite signals are spectrum modulated, and it is not necessary for the initialization processing portion 251 to synchronize, demodulate and acquire the positioning information used in initialization processing, for each satellite signal.

The initialization processing portion 251 assumes that the position information of the first communication device 100A included in the positioning information received from the first communication device 100A is the position information of the device itself. The initialization processing portion 251 can then use the assumed position information and the almanac data included in the positioning information received from the first communication device 100A to narrow down the satellites transmitting satellite signals that the device itself can receive. Using the position information of the device itself and the almanac data 113 to specify a plurality of satellites transmitting satellite signals that can be received by the device itself is generally known as warm start. In comparison to a case when initialization is performed by cold start, in which the satellites transmitting satellite signals that can be received by the device itself are found using brute force techniques to find the satellites, when initialization is performed by warm start, the time required for initialization can be reduced.

The positioning processing portion 252 synchronizes with each of the satellite signals transmitted from the plurality of satellites specified by the initialization processing portion 251. Following that, the positioning processing portion 252 acquires, from the synchronized satellite signal, the satellite time information that indicates a time of transmission of the satellite signal. At the same time, the positioning processing portion 252 also acquires, from the internal clock installed inside the device itself, current time information that indicates a current time. Next, based on the satellite time information and the current time information, the positioning processing portion 252 calculates a distance between the device itself and each of the plurality of satellites, respectively. The positioning processing portion 252 then performs positioning of the device itself, based on the calculated distances and a plurality of the ephemeris data.

Here, when the ephemeris data are stored by the storage portion 210, the positioning processing portion 252 can use the ephemeris data that are stored by the storage portion 210. When a predetermined period of time has elapsed since acquisition of the plurality of ephemeris data acquired respectively from the synchronized satellite signals, the positioning processing portion 252 may not use that ephemeris data. Furthermore, when a threshold value is stored in the storage portion 210, the positioning processing portion 252 may acquire, from the internal clock, the current time information that indicates the current time, and determine whether or not a difference value between the acquisition time information registered in the storage portion 210 and the current time information exceeds the threshold value stored by the storage portion 210. When the positioning processing portion 252 determines that the difference does not exceed the threshold value, the positioning processing portion 252 omits processing to acquire the plurality of ephemeris data from each of the synchronized satellite signals, and performs positioning based on the plurality of ephemeris data registered in the storage portion 210 in association with the acquisition time information, and on the distances.

Also, when the ephemeris data are not stored by the storage portion 210, the positioning processing portion 252 can further acquire the plurality of ephemeris data from each of the synchronized satellite signals, and can use the acquired plurality of ephemeris data. However, it generally takes from around 30 seconds to five minutes to acquire the plurality of ephemeris data from each of the synchronized satellite signals.

In this case, the positioning processing portion 252 can use the ephemeris data included in the positioning information received by the positioning information receiving portion 233. According to this structure, the positioning processing portion 252 can omit the time required to further acquire the plurality of ephemeris data from each of the synchronized satellite signals. When the positioning processing portion 252 uses the ephemeris data already held inside the device itself to start positioning in this way, the start is generally called hot start. In comparison to a case of performing positioning by warm start, in a case of performing positioning by hot start, it is possible to further reduce the time required for positioning.

The positioning processing portion 252 may acquire, from the internal clock, the current time information that indicates the current time, and may determine whether or not a difference value between the acquisition time information registered in the storage portion 210 and the current time information exceeds the threshold value stored by the storage portion 210. When the positioning processing portion 252 determines that the difference value does not exceed the threshold value, the positioning processing portion 252 may omit processing to perform positioning based on the plurality of ephemeris data received by the positioning information receiving portion 233 and on the distances, and may perform processing to further acquire the plurality of ephemeris data from each of the synchronized satellite signals and to perform positioning based on the acquired ephemeris data and the distances.

When the positioning processing portion 252 calculates the respective distances between the device itself and the plurality of satellites, based on the satellite time information and the current time information, the distance can be calculated, for example, by multiplying a difference value between the satellite time information and the current time information by the speed of light.

When performing positioning of the device itself, the positioning processing portion 252 can, for example, take as a point of reference the position of the satellite indicated by the ephemeris data, and calculate, for the plurality of satellites, a set of positions separated by the calculated distance, then determine, as the position of the device itself, a common point of the obtained respective sets.

The positioning processing portion 252 also assumes that the positioning information receiving portion 233 receives a plurality of the ephemeris data by wireless signal from a plurality of other communication devices, respectively. In such a case, from among the ephemeris data received respectively from the plurality of other communication devices by the positioning information receiving portion 233, positioning may be performed based on the distances and on the plurality of ephemeris data to which acquisition time information is attached that indicates a new time for the acquisition time of the plurality of ephemeris data. Furthermore, the positioning processing portion 252 may perform positioning based on the distances and on a plurality of ephemeris data that have been received by wireless signal with large radio wave strength, from among the plurality of ephemeris data received respectively from the other communication devices by the positioning information receiving portion 233.

The positioning information registering portion 253 registers, in the storage portion 210, position information 211 that indicates a position of the device itself for which positioning has been performed by the positioning processing portion 252. In addition, the positioning information registering portion 253 can also register, in the storage portion 210, the position information received by the positioning information receiving portion 233, the almanac data, the ephemeris data and the ephemeris data acquired by the positioning processing portion 252. When the positioning information registering portion 253 registers the position information, the ephemeris data and the almanac data in the storage portion 210, it can store each of the pieces of information in association with time information that indicates a time at which each of the pieces of information is acquired. Furthermore, the positioning information registering portion 253 may delete, as information that is not valid, all the pieces of information stored by the storage portion 210 that are associated with time information for which a predetermined period of time has elapsed.

The positioning information registering portion 253 may acquire, from the internal clock, acquisition time information that indicates a time at which the plurality of ephemeris data are acquired by the positioning processing portion 252, and may store the acquired acquisition time information and the plurality of ephemeris data in association with each other in the storage portion 210. Additionally, the positioning information registering portion 253 may acquire, from the internal clock, acquisition time information that indicates a time at which the plurality of ephemeris data are received by the positioning information receiving portion 233, and may store the acquired acquisition time information and the plurality of ephemeris data in association with each other in the storage portion 210.

1-4. Processing Performed by Communication System

Figure 4:
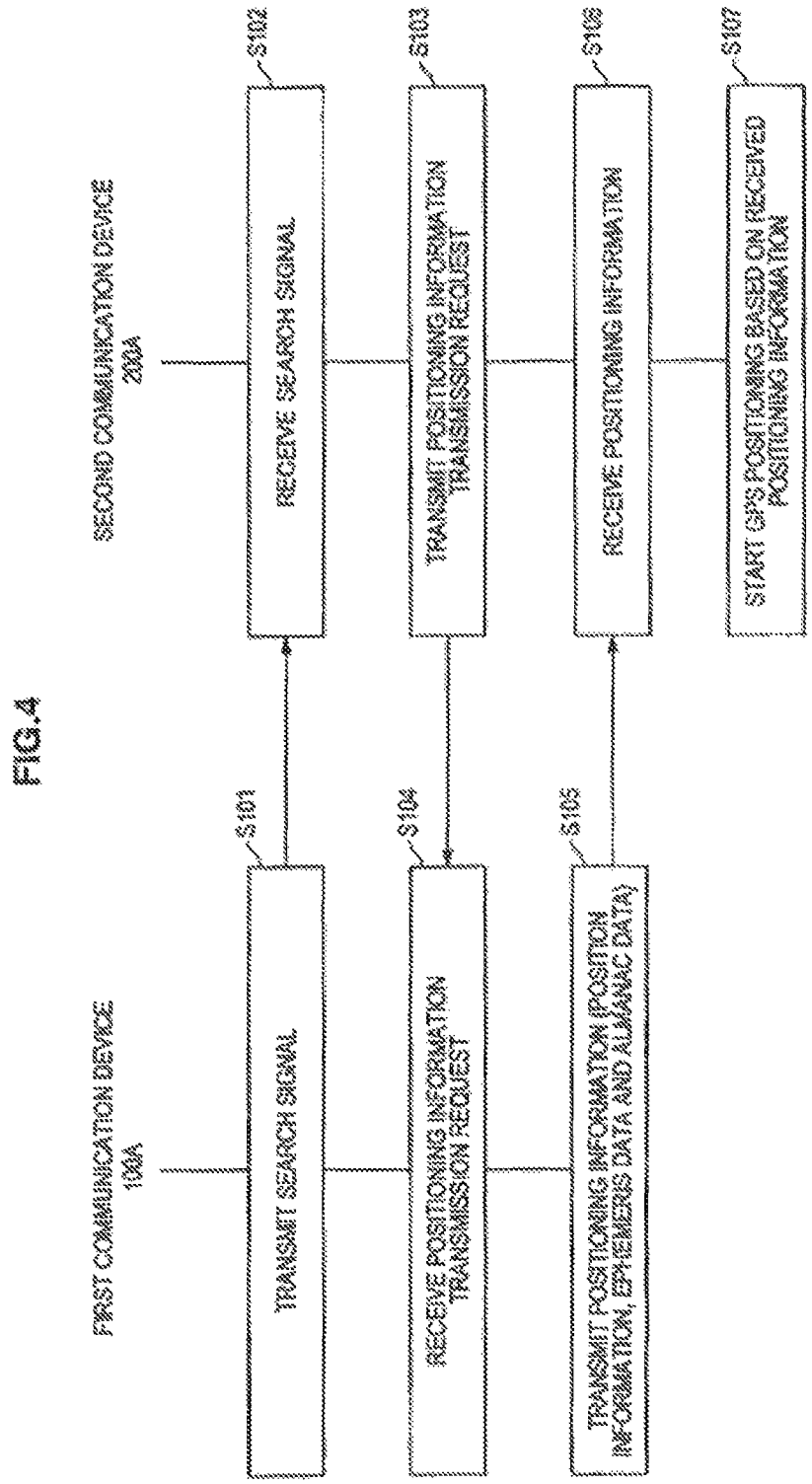
FIG. 4 is a sequence diagram showing a flow of processing performed by the communication system according to the first embodiment.

FIG. 4 is a sequence diagram showing a flow of processing performed by the communication system 10A according to the first embodiment. The processing performed by the communication system 10A according to the first embodiment will be explained with reference to FIG. 4 (other drawings will also be referred to as appropriate). Note that, in the flow of processing shown in FIG. 4, the positioning information transmitted from the first communication device 100A to the second communication device 200A includes position information of the first communication device 100A, ephemeris data and almanac data, but, as noted above, the positioning information is not limited to this example.

As shown in FIG. 4, first, the first communication device 100A transmits, by wireless signal, a search signal to the second communication device 200A (step S101). When the second communication device 200A receives, by wireless signal, the search signal from the first communication device 100A (step S102), it transmits, by wireless signal, a positioning information transmission request to the first communication device 100A (step S103).

When the first communication device 100A receives, by wireless signal, the positioning information transmission request from the second communication device 200A (step S104), it transmits, by wireless signal, positioning information (position information, ephemeris data and almanac data) to the second communication device 200A (step S105). When the second communication device 200A receives, by wireless signal, the positioning information from the first communication device 100A (step S106), it starts GPS positioning based on the received positioning information (step S107).

1-5. Processing Performed by Second Communication Device

Figure 5:
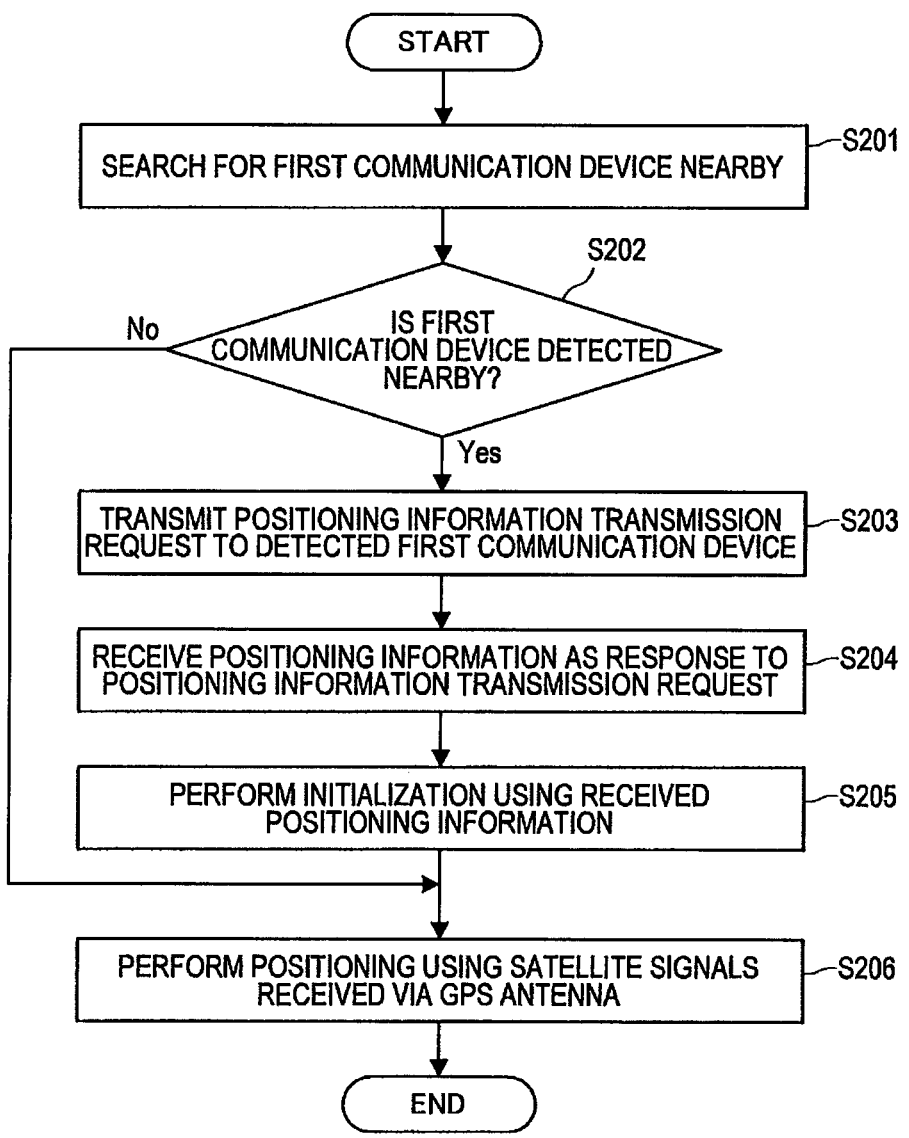
FIG. 5 is a flow chart showing a flow of processing performed by the second communication device according to the first embodiment.

FIG. 5 is a flow chart showing a flow of processing performed by the second communication device 200A according to the first embodiment. The processing performed by the second communication device 200A will be explained with reference to FIG. 5 (other drawings will also be referred to as appropriate).

As shown in FIG. 5, first, the second communication device 200A searches, by wireless signal, for the first communication device 100A nearby (step S201). When the second communication device 200A does not detect the first communication device 100A nearby (no at step S202), the processing advances to step S206.

When the second communication device 200A detects the first communication device 100A nearby (yes at step S202), the second communication device 200A transmits to the detected first communication device 100A the positioning information transmission request (step S203). As a response to the positioning information transmission request, the second communication device 200A receives positioning information (step S204) and uses the received positioning information to perform initialization (step S205). Next, the second communication device 200A performs positioning using satellite signals received via the GPS antenna 240 (step S206), and the processing is ended.

2. SECOND EMBODIMENT

A second embodiment of the present invention will be described.

2-1. Structure of Communication System

Figure 6:
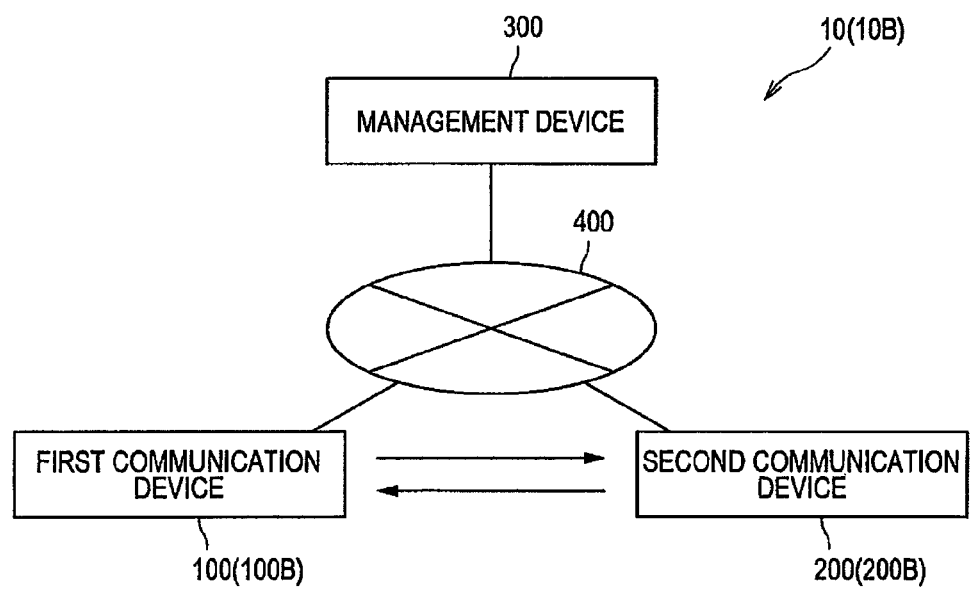
FIG. 6 is a diagram showing a structure of a communication system according to a second embodiment.

FIG. 6 is a diagram showing a structure of a communication system according to the second embodiment. As shown in FIG. 6, a communication system 10B according to the second embodiment includes a first communication device 100B, a second communication device 200B and a management device 300. Ad hoc communication can be performed between the first communication device 100B and the second communication device 200B via a wireless LAN or the like. The ad hoc communication is similar to that explained in relation to the first embodiment. The first communication device 100B and the second communication device 200B may be a terminal etc. that can be carried by a user, or may be a desk-top computer or the like.

The first communication device 100B, the second communication device 200B and the management device 300 are connected by a network 400, such as the Internet etc., and can mutually perform communication via the network 400. The management device 300 is assumed to be a desk-top computer or the like.

2-2. Structure of First Communication Device

Figure 7:
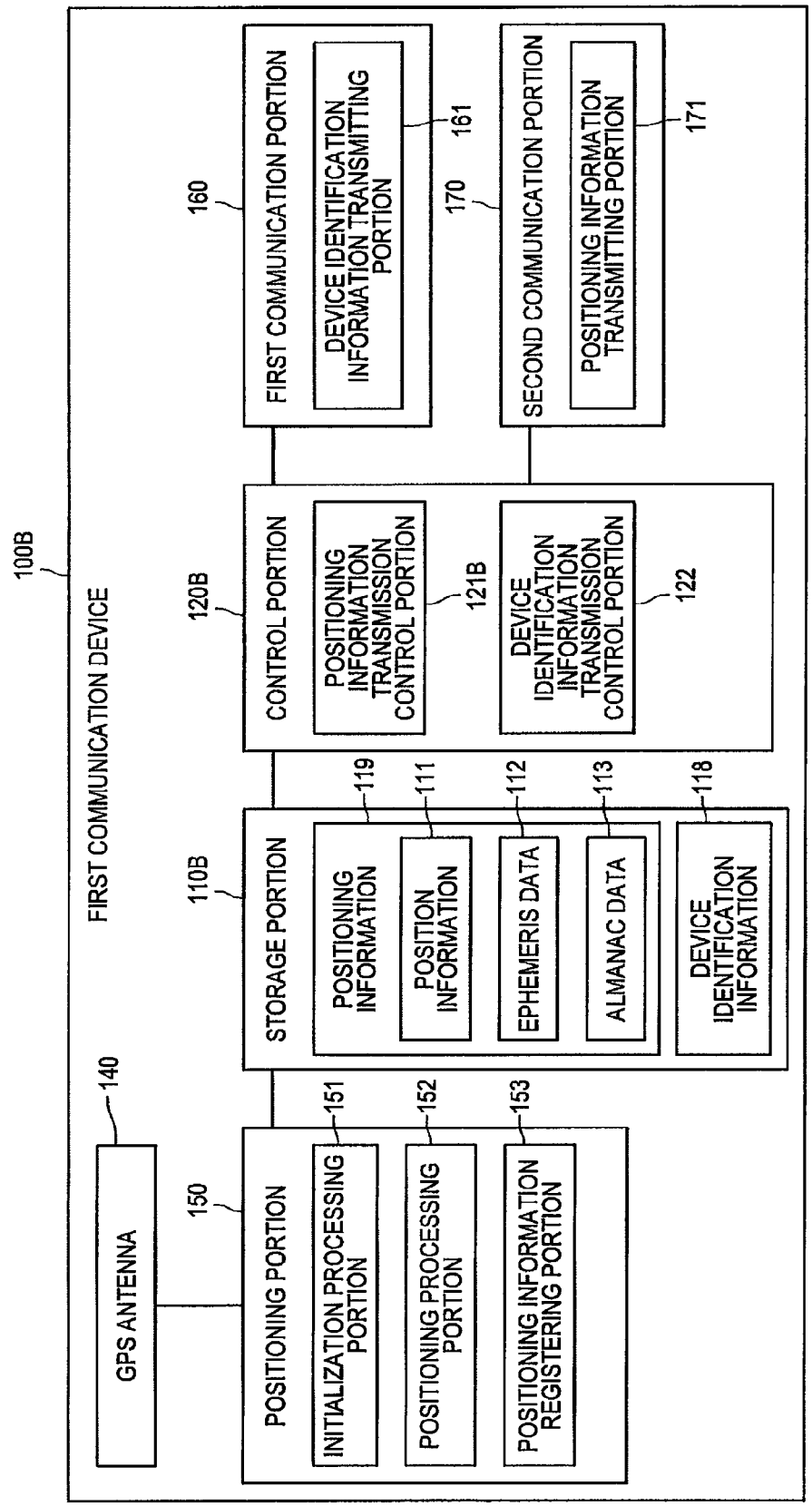
FIG. 7 is a diagram showing a structure of a first communication device according to the second embodiment.

FIG. 7 is a diagram showing a structure of the first communication device 100B according to the second embodiment. As shown in FIG. 7, the first communication device 100B differs from the first communication device 100A according to the first embodiment in that it includes a storage portion 110B in place of the storage portion 110A, a control portion 120B in place of the control portion 120A and a first communication portion 160 and a second communication portion 170 in place of the communication portion 130. The structure of these members will be explained.

The storage portion 110B further stores device identification information 118. The device identification information 118 is not particularly limited, as long as it is information that identifies the first communication device 100B. For example, a MAC address that identifies the first communication device 100B can be used as the device identification information 118.

The control portion 120B differs from the control portion 120A according to the first embodiment in that it has a positioning information transmission control portion 121B in place of the positioning information transmission control portion 121A and it further has a device identification information transmission control portion 122.

The positioning information transmission control portion 121B controls processing to transmit positioning information. The positioning information transmission control portion 121B acquires the device identification information 118 and the positioning information 119 from the storage portion 110B, and controls processing such that a positioning information transmitting portion 171 transmits the acquired device identification information 118 and the positioning information 119 to the management device 300. As timing at which the positioning information 119 is transmitted by the positioning information transmitting portion 171 is not particularly limited, and can be, for example, immediately after the positioning portion 150 has completed positioning with respect to the position of the device itself and has registered the position in the storage portion 110B. In addition, the positioning information transmitting portion 171 may periodically transmit the positioning information 119. Further, the positioning information transmission control portion 121B controls processing such that a device identification information transmitting portion 161 transmits the device identification information 118 that identifies the device itself, by wireless signal using ad hoc communication.

The first communication portion 160 includes the device identification information transmitting portion 161. The first communication portion 160 is a communication interface or the like, and can perform ad hoc communication with the second communication device 200B using wireless signals.

The device identification information transmitting portion 161 transmits, by wireless signal to the second communication device 200B, the device identification information 118 that identifies the device itself.

The second communication portion 170 includes the positioning information transmitting portion 171. The positioning information transmitting portion 171 is a communication interface or the like, and can perform communication with the management device 300 via the network 400.

The positioning information transmitting portion 171 transmits the positioning information 119 to the management device 300 via the network 400.

2-3. Structure of Second Communication Device

Figure 8:
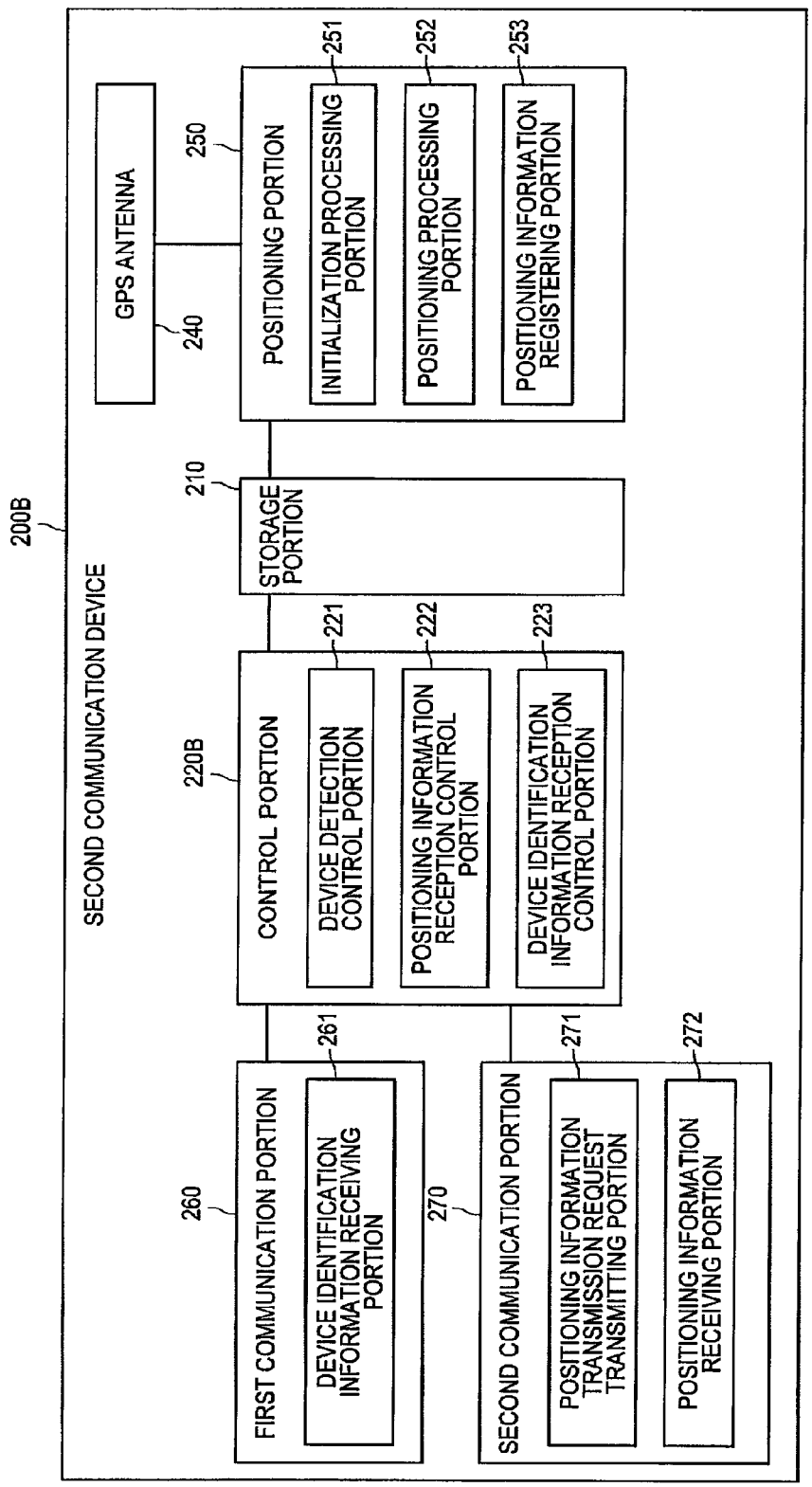
FIG. 8 is a diagram showing a structure of a second communication device according to the second embodiment.

FIG. 8 is a diagram showing a structure of the second communication device 200B according to the second embodiment. As shown in FIG. 8, the second communication device 200B differs from the second communication device 200A according to the first embodiment in that it includes a control portion 220B in place of the control portion 220A, and a first communication portion 260 and a second communication portion 270 in place of the communication portion 230. The structure of these members will be explained.

The control portion 220B differs from the control portion 220A according to the first embodiment in that it further includes a device identification information reception control portion 223. The control portion 220B is, for example, a CPU, a RAM or the like. Functions of the control portion 220B are realized, for example, by the program stored in the storage portion 210 being loaded into the RAM by the CPU, and the program loaded into the RAM then being executed by the CPU.

The device identification information reception control portion 223 controls processing such that a device identification information receiving portion 261 receives the device identification information from the first communication device 100B, by wireless signal using ad hoc communication. When the device identification information reception control portion 223 receives the device identification information from the first communication device 100B, it outputs the received device identification information to the positioning information reception control portion 222.

A positioning information transmission request transmitting portion 271 transmits the positioning information transmission request, which includes the device identification information received by the device identification information receiving portion 261, to the management device 300 via the network 400. There is no particular limit on a timing at which the positioning information transmission request transmitting portion 271 transmits the positioning information transmission request, and it can be a predetermined timing at which positioning is necessary.

As a response to the positioning information transmission request, a positioning information receiving portion 272 receives, from the management device 300 via the network 400, positioning information which is associated with the device identification information and is managed by the management device 300.

2-4. Structure of Management Device

Figure 9:
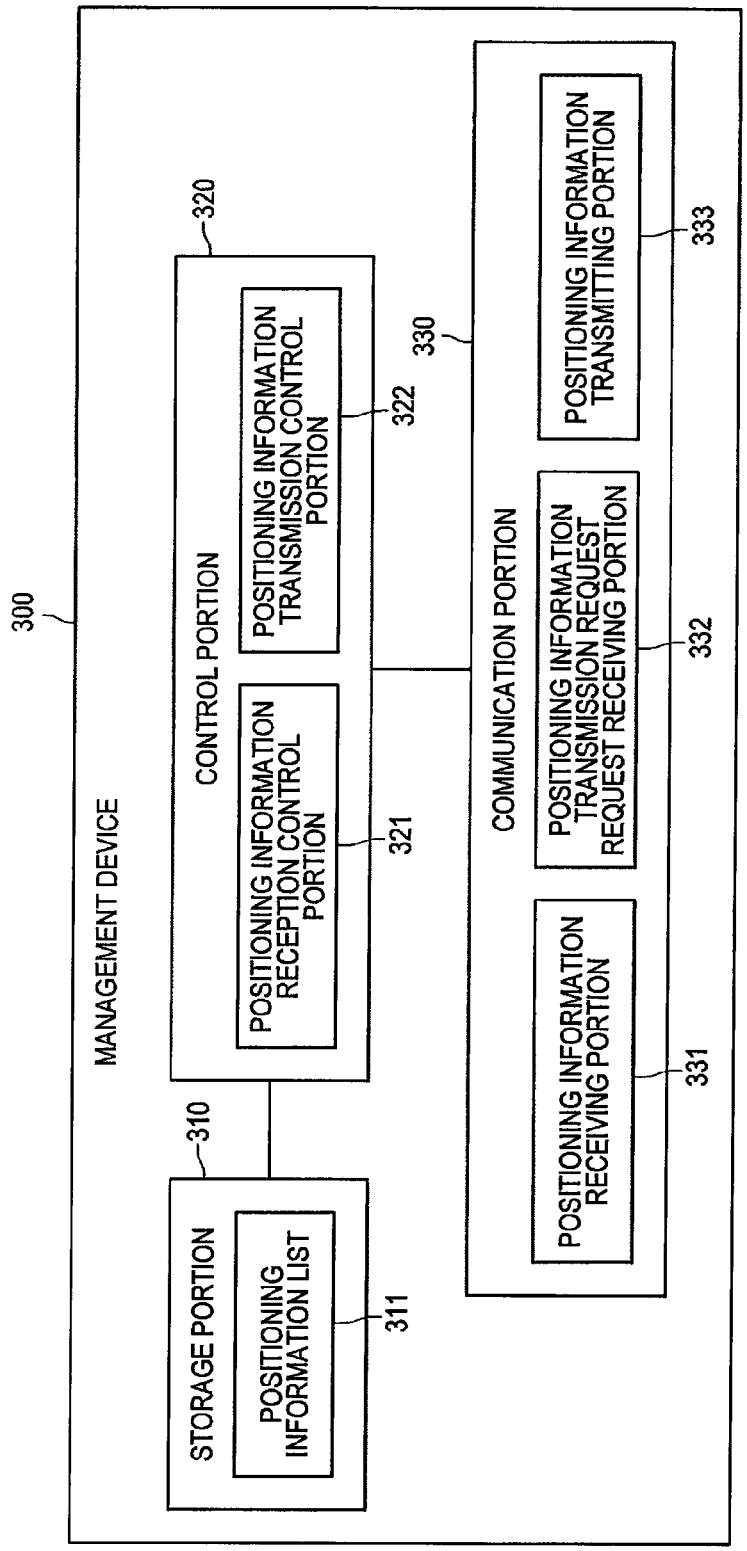
FIG. 9 is a diagram showing a management device according to the second embodiment.

FIG. 9 is a diagram showing a structure of the management device 300 according to the second embodiment. As shown in FIG. 9, the management device 300 includes a storage portion 310, a control portion 320 and a communication portion 330.

The storage portion 310 stores a positioning information list 311. The storage portion 310 is a storage device, such as an HDD, for example. The positioning information list 311 is registered in the storage portion 310 by the control portion 320, which will be explained later. The positioning information list 311 is, for example, a list of data that are associated information, namely the device identification information to identify the first communication device 100B associated with the positioning information acquired by the first communication device 100B. The storage portion 310 can also store a program and data etc. that is used when the program is executed.

The control portion 320 includes a positioning information reception control portion 321 and a positioning information transmission control portion 322. The control portion 320 is, for example, a CPU, a RAM or the like. Functions of the control portion 320 are realized, for example, by the program stored in the storage portion 310 being loaded into the RAM by the CPU, and the program loaded into the RAM then being executed by the CPU.

The positioning information reception control portion 321 controls processing to receive the positioning information. First, the positioning information reception control portion 321 controls processing such that the positioning information and the device identification information received by a positioning information receiving portion 331 via the network 400 are registered in association with each other on the positioning information list 311. Next, the positioning information transmission control portion 322 controls processing such that a positioning information transmission request receiving portion 332 receives, from the second communication device 200B, a positioning information transmission request that includes the device identification information to identify the second communication device 200B. Following that, the positioning information transmission control portion 322 acquires, from the storage portion 310, the positioning information, which is managed in association with the device identification information included in the positioning information transmission request. The positioning information transmission control portion 322 then controls processing such that a positioning information transmitting portion 333 transmits the acquired positioning information 119 to the second communication device 200B.

The communication portion 330 includes the positioning information receiving portion 331, the positioning information transmission request receiving portion 332 and the positioning information transmitting portion 333. The communication portion 330 is a communication interface or the like, and can perform communication with the first communication device 100B and the second communication device 200B via the network 400.

The positioning information receiving portion 331 receives, from the first communication device 100B, the positioning information acquired by the first communication device 100B and the device identification information to identify the first communication device 100B.

The positioning information transmission request receiving portion 332 receives, from the second communication device 200B via the network 400, the positioning information transmission request that includes the device identification information to identify the first communication device 100B.

As a response to the positioning information transmission request, the positioning information transmitting portion 333 transmits the positioning information to the second communication device 200B.

2-5. Processing Performed by Communication System

Figure 10:
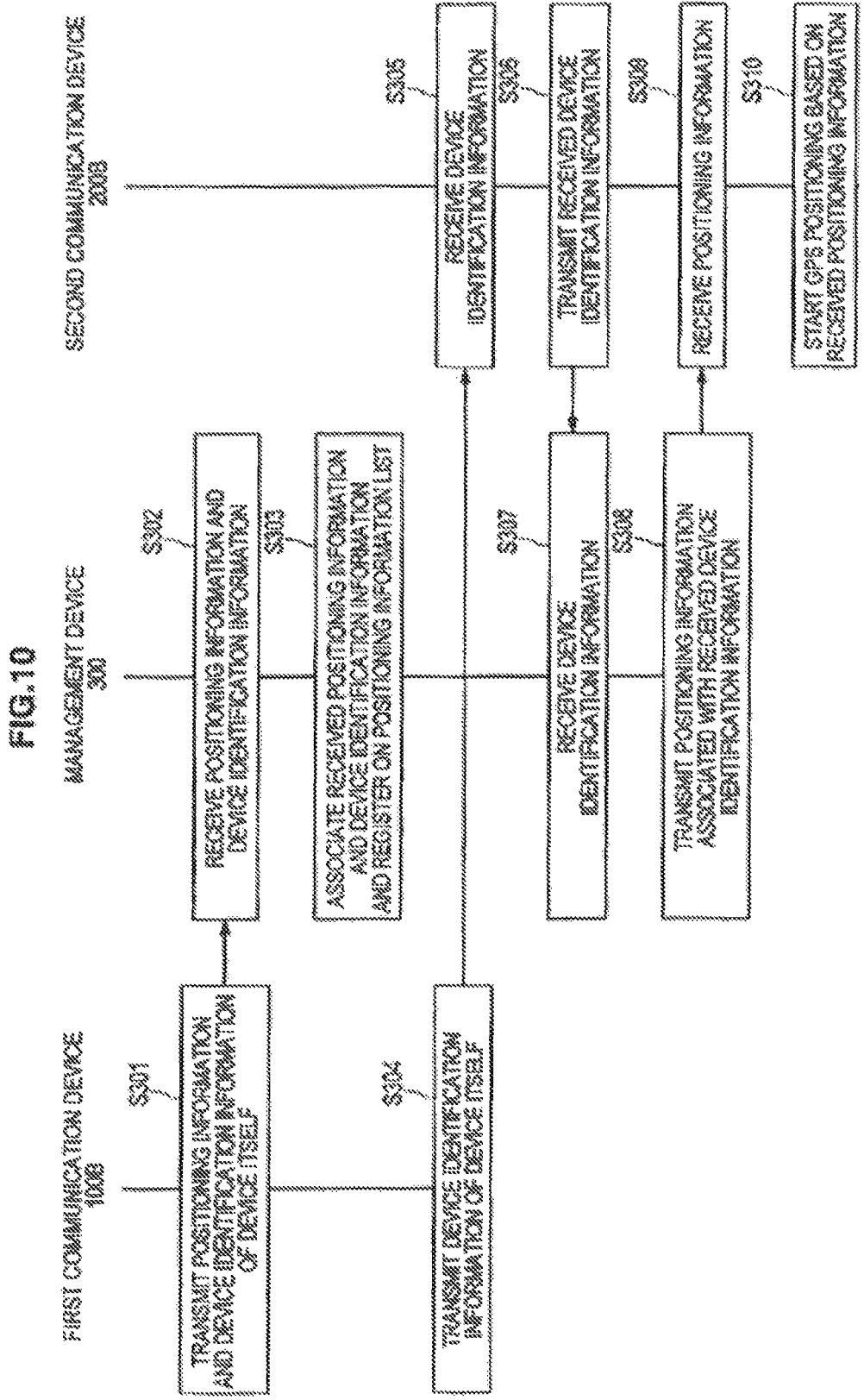
FIG. 10 is a sequence diagram showing a flow of processing performed by the communication system according to the second embodiment.

FIG. 10 is a sequence diagram showing a flow of processing performed by the communication system 10B according to the second embodiment. The processing performed by the communication system 10B will be explained with reference to FIG. 10 (other drawings will also be referred to as appropriate).

As shown in FIG. 10, first, the first communication device 100B transmits, to the management device 300 via the network 400, the positioning information acquired by the device itself and the device identification information to identify the device itself (step S301). When the management device 300 receives the positioning information and the device identification information from the first communication device 100B via the network 400 (step S302), it registers the received positioning information and device identification information in the positioning information list 311 in association with each other (step S303).

The first communication device 100B transmits, to the second communication device 200B by wireless signal, the device identification information to identify the first communication device 100B (step S304). When the second communication device 200B receives, by wireless signal, the device identification information from the first communication device 100B (step S305), it transmits the received device identification information to the management device 300 via the network 400 (step S306). When the management device 300 receives the device identification information via the network 400 (step S307), it transmits the positioning information that is associated with the received device identification information to the second communication device 200B (step S308).

When the second communication device 200B receives the positioning information via the network 400 (step S309), it starts GPS positioning based on the received positioning information (step S310).

2-6. Processing Performed by Second Communication Device

Figure 11:
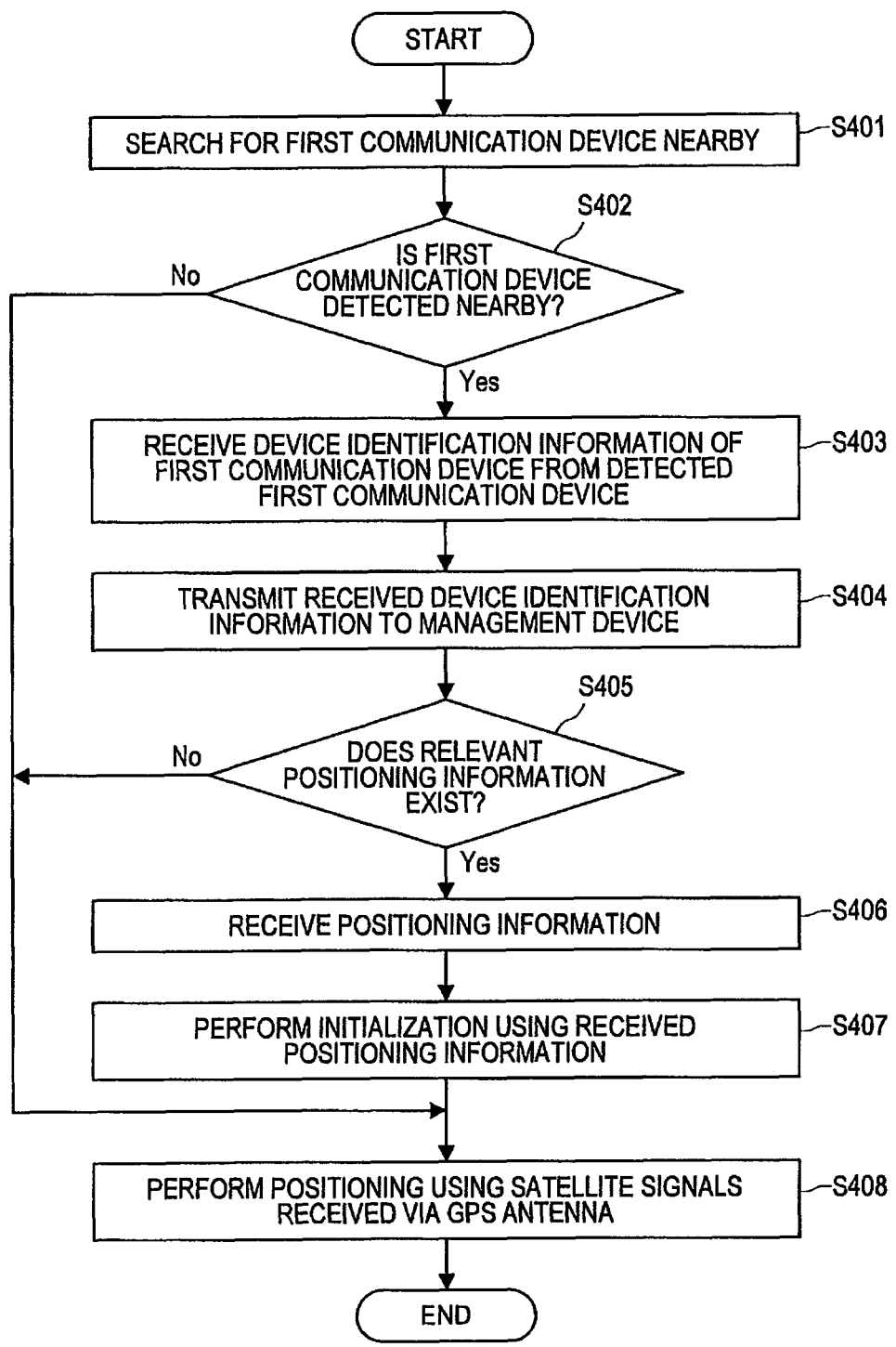
FIG. 11 is a flow chart showing a flow of processing performed by the second communication device according to the second embodiment.

FIG. 11 is a flow chart showing a flow of processing performed by the second communication device 200B according to the second embodiment. The processing performed by the second communication device 200B will be explained with reference to FIG. 11 (other drawings will also be referred to as appropriate).

As shown in FIG. 11, first, the second communication device 200B searches, by wireless signal, for the first communication device 100B nearby (step S401). When the second communication device 200B does not detect the first communication device 100B nearby (no at step S402), the processing advances to step S408.

When the second communication device 200B detects the first communication device 100B nearby (yes at step S402), the second communication device 200B receives, from the detected first communication device 100B, the device identification information of the first communication device 100B (step S403). The second communication device 200B transmits the received device identification information to the management device 300 via the network 400 (step S404). When the positioning information relevant to the management device 300 does not exist (no at step S405), the processing advances to step S408.

When the positioning information exists that is relevant to the management device 300 (yes at step S405), the second communication device 200B receives the positioning information as a response to the positioning information transmission request (step S406) and performs initialization using the received positioning information (step S407). Next, the second communication device 200B performs positioning using the satellite signals received via the GPS antenna 240 (step S408) and the processing is ended.

3. MODIFIED EXAMPLE

It should be understood by those skilled in the art that various modifications, combinations, sub-combinations and alterations may occur depending on design requirements and other factors insofar as they are within the scope of the appended claims or the equivalents thereof.

For example, it is assumed that, in some cases, the second communication device 200 does not have a function to perform positioning by GPS. In this case, the second communication device 200 can also use the positioning information received from the first communication device 100 as it is. More specifically, the second communication device 200 can, for example, use the position information of the first communication device 100 received from the first communication device 100 as it is, as the position of the second communication device 200.

4. CONCLUSION

According to the above embodiments, in addition to reducing effort and costs required to install equipment at a base station in order to perform positioning, it is also possible, in a situation in which communication cannot be performed with the base station, to shorten the time required for a terminal to perform positioning. More specifically, the second communication device 200 can perform initialization using positioning information (almanac data, position information of the second communication device 200 etc.) acquired by the first communication device 100. It is thus possible to shorten the time to specify satellites transmitting satellite signals to be used in positioning. In addition, as the second communication device 200 can use the positioning information (ephemeris data etc.) acquired by the first communication device 100 to perform positioning, it is possible to omit the time to download positioning information (ephemeris data etc.) from the satellite signals.

The present application contains subject matter related to that disclosed in Japanese Priority Patent Application JP 2009-160800 filed in the Japan Patent Office on Jul. 7, 2009, the entire content of which is hereby incorporated by reference.

What is claimed is:
1. A communication device, comprising:
a positioning information receiving portion that receives positioning information, by wireless signal, from another communication device, the positioning information including first satellite orbit information that indicates respective orbits of a specific number of satellites and position information that indicates a position of the other communication device;
an initialization processing portion that performs initialization processing that specifies, based on the positioning information, from among the specific number of satellites, a plurality of satellites transmitting satellite signals that can be received by the communication device;
a satellite signal receiving portion that receives satellite signals from each of the specific number of satellites; and
a positioning processing portion that, from among the satellite signals received by the satellite signal receiving portion, synchronizes-the satellite signals transmitted from each of the plurality of satellites specified by the initialization processing portion, acquires, from the synchronized satellite signal, satellite time information indicating a transmission time of the satellite signal and, acquires, from an internal clock installed inside the communication device, current time information indicating a current time, calculates, based on the satellite time information and the current time information, a distance between the communication device and each of the plurality of satellites, and performs positioning of the communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information.

2. The communication device according to claim 1, wherein the positioning processing portion additionally acquires the plurality of second satellite orbit information from each of the synchronized satellite signals, and performs the positioning based on the acquired plurality of second satellite orbit information and the distances.

3. The communication device according to claim 2, further comprising:
a storage portion that stores a threshold value; and
a positioning information registering portion that acquires, from the internal clock, acquisition time information indicating a time at which the plurality of second satellite orbit information is acquired by the positioning processing portion, and registers the acquired acquisition time information in the storage portion in association with the plurality of second satellite orbit information,
wherein the positioning processing portion acquires, from the internal clock, current time information indicating a current time, determines whether a difference value between the acquisition time information and the current time information exceeds the threshold value, and, when the difference value does not exceed the threshold value, omits processing to acquire the plurality of second satellite orbit information from each of the synchronized satellite signals and performs the positioning based on the plurality of second satellite orbit information registered in the storage portion in association with the acquisition time information and on the distances.

4. The communication device according to claim 1,
wherein the positioning information receiving portion additionally receives the plurality of second satellite orbit information by the wireless signal from the other communication device, and
wherein the positioning processing portion performs the positioning based on the plurality of second satellite orbit information received by the positioning information receiving portion and on the distances.

5. The communication device according to claim 4, further comprising:
a storage portion that stores a threshold value; and
a positioning information registering portion that acquires, from the internal clock, acquisition time information indicating a time at which the plurality of second satellite orbit information is received by the positioning information receiving portion, and registers the acquired acquisition time information in the storage portion in association with the plurality of second satellite orbit information, wherein the positioning processing portion acquires, from the internal clock, current time information indicating a current time, determines whether a difference value between the acquisition time information registered in the storage portion and the current time information exceeds the threshold value stored by the storage portion, and, when the difference value does not exceed the threshold value, omits processing to perform the positioning based on the plurality of second satellite orbit information received by the positioning information receiving portion and on the distances, further acquires the plurality of second satellite orbit information from each of the synchronized satellite signals, and performs the positioning based on the acquired plurality of second satellite orbit information and the distances.

6. The communication device according to claim 4, wherein, when the positioning information receiving portion receives the plurality of second satellite orbit information by the wireless signal from each of a plurality of the other devices, the positioning processing portion performs the positioning based on the plurality of second satellite orbit information to which acquisition time information indicating a new acquisition time of the plurality of second satellite orbit information is attached, from among the plurality of second satellite orbit information received from each of the plurality of other devices, and on the distances.

7. The communication device according to claim 4, wherein, when the positioning information receiving portion receives the plurality of second satellite orbit information by the wireless signal from each of the plurality of other communication devices, the positioning processing portion performs the positioning based the distances and on the plurality of second satellite orbit information that is received by the wireless signal with large radio wave strength, from among the plurality of second satellite orbit information received from each of the plurality of other communication devices by the positioning information receiving portion.

8. A communication device comprising:
a device identification information receiving portion that receives, by wireless signal, from another communication device, device identification information to identify the other communication device;
a positioning information transmission request transmitting portion that transmits, to a management device via a network, a positioning information transmission request that includes the device identification information received by the device identification information receiving portion;
a positioning information receiving portion that receives, from the management device via the network, as a response to the positioning information transmission request, positioning information that is associated with the device identification information and is managed by the management device, the positioning information including first satellite orbit information and position information, the first satellite orbit information indicating respective orbits of a specific number of satellites and the position information indicating a position of the other communication device;
an initialization processing portion that performs initialization processing that specifies, based on the positioning information, from among the specific number of satellites, a plurality of satellites transmitting satellite signals that can be received by the communication device;
a satellite signal receiving portion that receives satellite signals from each of the specific number of satellites; and
a positioning processing portion that, from among the satellite signals received by the satellite signal receiving portion, synchronizes with the satellite signals transmitted from each of the plurality of satellites specified by the initialization processing portion acquires, from the synchronized satellite signal, satellite time information indicating a transmission time of the satellite signal; acquires, from an internal clock installed inside the communication device, current time information indicating a current time; calculates, based on the satellite time information and the current time information, a distance between the communication device and each of the plurality of satellites; and performs positioning of the communication device, based on the calculated distances and on a plurality of second satellite orbit information associated corresponding ones of the plurality of satellites; the plurality of second satellite orbit information indicating the respective orbits of the plurality of satellites to a higher degree of accuracy than indicated by the first satellite orbit information.

9. A communication method, comprising the steps of:
receiving, by wireless signal from another communication device, positioning information that includes first satellite orbit information indicating orbits of each of a specific number of satellites and position information indicating a position of the other communication device, the positioning information being received by a positioning information receiving portion of a communication device that has the positioning information receiving portion, an initialization processing portion, a satellite signal receiving portion, and a positioning processing portion;
performing initialization processing that specifies, based on the positioning information, from among the specific number of satellites, a plurality of satellites transmitting satellite signals that can be received by the communication device, the initialization processing being performed by the initialization processing portion;
receiving satellite signals from each of the specific number of satellites, the satellite signals being received by the satellite signal receiving portion; and
synchronizing, from among the satellite signals received by the satellite signal receiving portion, with the satellite signals transmitted from each of the plurality of satellites specified by the initialization processing portion; acquiring, from the synchronized satellite signal, satellite time information that indicates a transmission time of the satellite signal; also acquiring, from an internal clock installed inside the communication device, current time information that indicates a current time; calculating, based on the satellite time information and the current time information, a distance between the communication device and each of the plurality of satellites; and performing positioning of the communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information, the positioning being performed by the positioning processing portion.

10. A communication method, comprising the steps of:
receiving, by wireless signal from another communication device, device identification information to identify the other communication device, the device identification information being received by a device identification information receiving portion of a communication device the communications device including the device identification information receiving portion, a positioning information transmission request transmitting portion, a positioning information receiving portion, an initialization processing portion, a satellite signal receiving portion and a positioning processing portion;
transmitting, to a management device via a network, a positioning information transmission request that includes the device identification information received by the device identification information receiving portion, the positioning information transmission request being transmitted by the positioning information transmission request transmitting portion;
receiving, from the management device via the network, as a response to the positioning information transmission request, positioning information that is associated with the device identification information and is managed by the management device, the positioning information including first satellite orbit information indicating respective orbits of a specific number of satellites and position information indicating a position of the other communication device, the positioning information being received by the positioning information receiving portion;
performing initialization processing that specifies, based on the positioning information, from among the specific number of satellites, a plurality of satellites transmitting satellite signals that can be received by the communication device, the initialization processing being performed by the initialization processing portion;
receiving satellite signals from each of the specific number of satellites, the satellite signals being received by the satellite signal receiving portion; and
synchronizing, from among the satellite signals received by the satellite signal receiving portion, with the satellite signals transmitted from each of the plurality of satellites specified by the initialization processing portion; acquiring, from the synchronized satellite signal, satellite time information that indicates a transmission time of the satellite signal; also acquiring, from an internal clock installed inside the communication device, current time information that indicates a current time; calculating, based on the satellite time information and the current time information, a distance between the communication device and each of the plurality of satellites; and performing positioning of the communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information, the positioning being performed by the positioning processing portion.

11. A tangible, non-transitory computer-readable medium storing instructions that, when executed by a computer, command the computer to function as a communication device including:
a positioning information receiving portion that receives positioning information, by wireless signal, from another communication device, the positioning information including first satellite orbit information that indicates respective orbits of a specific number of satellites and position information that indicates a position of the other communication device;
an initialization processing portion that performs initialization processing that specifies, based on the positioning information, from among the specific number of satellites, a plurality of satellites transmitting satellite signals that can be received by the communication device;
a satellite signal receiving portion that receives satellite signals from each of the specific number of satellites; and
a positioning processing portion that, from among the satellite signals received by the satellite signal receiving portion, synchronizes with the satellite signals transmitted from each of the plurality of satellites specified by the initialization processing portion; acquires, from the synchronized satellite signal, satellite time information indicating a transmission time of the satellite signal; acquires, from an internal clock installed inside the communication device, current time information indicating a current time; calculates, based on the satellite time information and the current time information, a distance between the communication device and each of the plurality of satellites; and performs positioning of the communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information.

12. A tangible, non-transitory computer-readable medium storing instructions that, when executed by a computer, command the computer to function as a communication device including:
a device identification information receiving portion that receives, by wireless signal from another communication device, device identification information to identify the other communication device;
a positioning information transmission request transmitting portion that transmits, to a management device via a network, a positioning information transmission request that includes the device identification information received by the device identification information receiving portion;
a positioning information receiving portion that receives, from the management device via the network, as a response to the positioning information transmission request, positioning information that is associated with the device identification information and is managed by the management device, the positioning information including first satellite orbit information and position information, the first satellite orbit information indicating respective orbits of a specific number of satellites and the position information indicating a position of the other communication device;
an initialization processing portion that performs initialization processing that specifies, based on the positioning information, from among the specific number of satellites, a plurality of satellites transmitting satellite signals that can be received by the communication device;

a satellite signal receiving portion that receives satellite signals from each of the specific number of satellites; and a positioning processing portion that, from among the satellite signals received by the satellite signal receiving portion, synchronizes with the satellite signals transmitted from each of the plurality of satellites specified by the initialization processing portion; acquires, from the synchronized satellite signal, satellite time information indicating a transmission time of the satellite signal; acquires, from an internal clock installed inside the communication device, current time information indicating a current time; calculates, based on the satellite time information and the current time information, a distance between the communication device and each of the plurality of satellites; and performs positioning of the communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information.

13. A communication system including a first communication device and a second communication device, wherein:

the first communication device comprises a positioning information transmitting portion that transmits positioning information, by wireless signal, to the second communication device, the positioning information including first satellite orbit information indicating respective orbits of a specific number of satellites and position information indicating a position of the first communication device; and the second communication device comprises:
 a positioning information receiving portion that receives the positioning information, by the wireless signal, from the first communication device;
 an initialization processing portion that performs initialization processing that specifies, based on the positioning information, from among the specific number of satellites, a plurality of satellites transmitting satellite signals that can be received by the first communication device;
 a satellite signal receiving portion that receives satellite signals from each of the specific number of satellites; and
 a positioning processing portion that, from among the satellite signals received by the satellite signal receiving portion, synchronizes with the satellite signals transmitted from each of the plurality of satellites specified by the initialization processing portion; acquires, from the synchronized satellite signal, satellite time information indicating a transmission time of the satellite signal; acquires, from an internal clock installed inside the first communication device, current time information indicating a current time; calculates, based on the satellite time information and the current time information, a distance between the first communication device and each of the plurality of satellites; and performs positioning of the first communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information.

14. A communication system including a first communication device, a management device and a second communication device, wherein:

the first communication device comprises a positioning information transmitting portion that transmits, to the management device via a network, positioning information, which includes first satellite orbit information indicating respective orbits of a specific number of satellites and position information indicating a position of the first communication device, and device identification information to identify the first communication device;

the management device comprises:
 a storage portion;
 a positioning information receiving portion that receives the positioning information and the device identification information via the network from the first communication device;
 a positioning information reception control portion that registers the positioning information and the device identification information received by the positioning information receiving portion in the storage portion in association with each other;
 a positioning information transmission request receiving portion that receives a positioning information transmission request via the network from the second communication device, the positioning information transmission request including the device identification information;
 a positioning information transmission control portion that acquires the positioning information that is registered in the storage portion in association with the device identification information included in the positioning information transmission request; and
 a positioning information transmitting portion that transmits, to the second communication device via the network, the positioning information acquired by the positioning information transmission control portion; and the second communication device comprises:
 a device identification information receiving portion that receives, by wireless signal, from the first communication device, the device identification information to identify the first communication device;
 a positioning information transmission request transmitting portion that transmits, to the management device via the network, the positioning information transmission request that includes the device identification information received by the device identification information receiving portion;
 a positioning information receiving portion that receives, from the management device via the network, as a response to the positioning information transmission request, the positioning information that is associated with the device identification information and is managed by the management device;
 an initialization processing portion that performs initialization processing that specifies, based on the positioning information, from among the specific number of satellites, a plurality of satellites transmitting satellite signals that can be received by the first communication device;
 a satellite signal receiving portion that receives satellite signals from each of the specific number of satellites; and
 a positioning processing portion that, from among the satellite signals received by the satellite signal receiving portion, synchronizes with the satellite signals transmitted from each of the plurality of satellites specified by the initialization processing portion; acquires, from the synchronized satellite signal, satellite time information indicating a transmission time of the satellite signal; acquires, from an internal clock installed inside the first communication device, current time information indicating a current time; calculates, based on the satellite time information and the current time information, a distance between the first communication device and each of the plurality of satellites; and performs positioning of the first communication device, based on the calculated distances and on a plurality of second satellite orbit information associated corresponding ones of the plurality of satellites, the plurality of second satellite orbit information indicating the respective orbits of the plurality of satellites to a higher degree of accuracy than indicated by the first satellite orbit information.

* * * * *